3,511,110
ENGINE BALANCER
Wayne Bruce Grieve, Dubuque, Iowa, assignor to Deere & Company, Moline, Ill., a corporation of Delaware
Filed July 22, 1968, Ser. No. 746,464
Int. Cl. F16f 15/22, 15/26
U.S. Cl. 74—604                           9 Claims

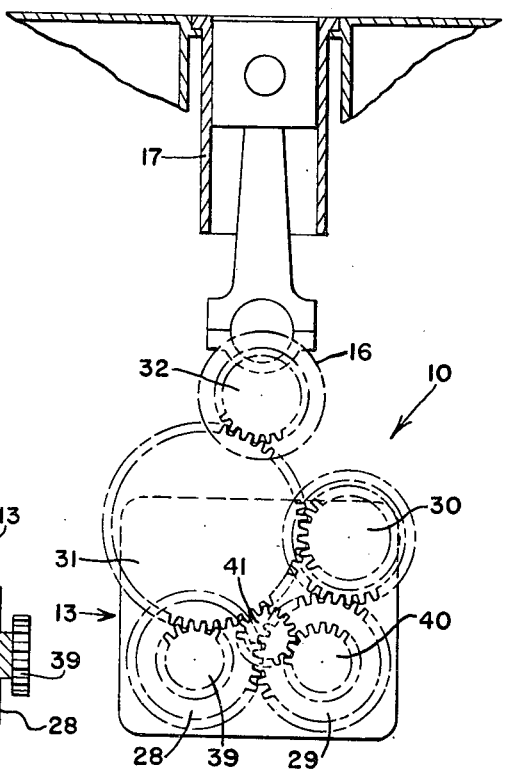
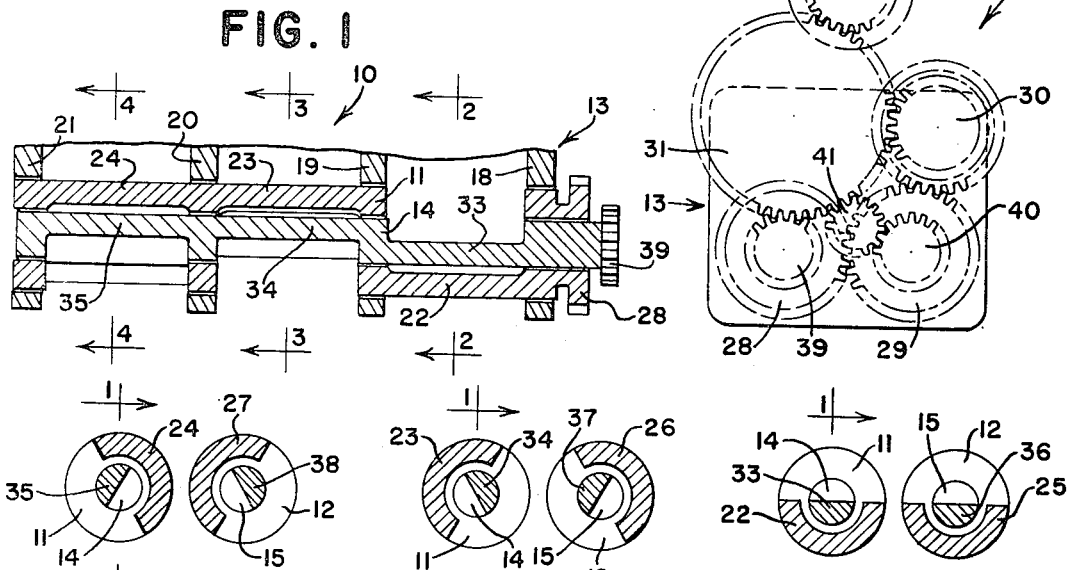
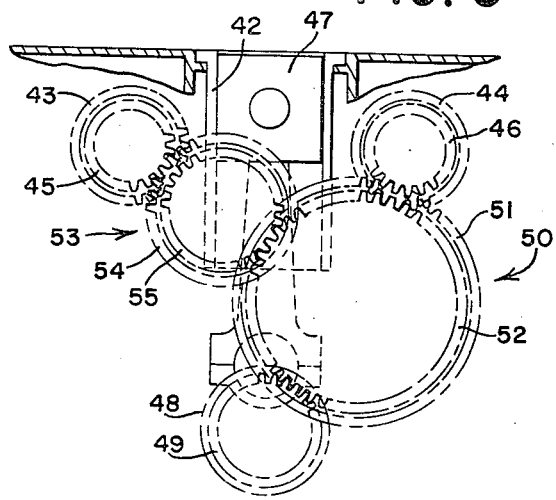
FIG. 5
FIG. 1
FIG. 4   FIG. 3   FIG. 2
FIG. 6
INVENTOR.
WAYNE B. GRIEVE

United States Patent Office 3,511,110
Patented May 12, 1970

ABSTRACT OF THE DISCLOSURE

An engine balancer which balances both primary and secondary inertia forces for each cylinder of an in-line engine. Two primary weight shafts are mounted parallel to the crankshaft, located equal distances from the center line of the cylinders, and are driven in opposite directions at crankshaft speed. These primary weight shafts are bored out and have secondary weight shafts revolving within them at twice crankshaft speed. The secondary weight shafts are driven in the same direction as the primary weight shafts in which they turn, thus keeping the rubbing velocity of the secondary weight shafts down to crankshaft speed effect.

BACKGROUND OF THE INVENTION

The present invention relates generally to an engine balancer, and more particularly to an engine balancer which will suppress both primary and secondary vibrations set up in the engine.

In certain reciprocating piston engines and other machines having reciprocating components, vibrations are often present because of unbalanced inertia forces set up by the reciprocating components. For example, the conventional one, two, three, five, seven, and nine cylinder in-line engines have been plagued with both primary and secondary unbalanced inertia forces while the four cylinder in-line engine exhibited secondary unbalanced inertia forces and other engines such as the six cylinder in-line and the eight cylinder, both the in-line and 90° V with two plane crankshafts, are inherently in balance. The primary unbalanced inertia forces are those which act at engine speed or go through one full cycle for each revolution of the engine crankshaft, and the secondary unbalanced inertia forces are those which act at twice engine speed or go through two full cycles for each revolution of the engine crankshaft.

It has previously been proposed to balance engines which were not inherently in balance by counteracting the unbalanced inertia forces with eccentrically weighted counterrotating shafts which would set up forces equal and opposite to the inertia forces set up by the reciprocating parts of the engine. However, in order to balance both the primary and secondary unbalanced inertia forces present in many engines, it has been necessary to provide two separate and distinct sets of counterrotating shafts, one set rotating at crankshaft speed and the second set rotating at twice crankshaft speed. The use of two sets of counterrotating shafts required that the engine casing be larger to accommodate the four shafts and left designers with the problem of building a small unbalanced engine or a larger balanced engine. Also, with one set of shafts rotating at twice crankshaft speed, the rubbing velocity of these shafts on their supports was extremely high.

SUMMARY OF THE INVENTION

An object of the present invention is to provide an engine balancer which would balance both primary and secondary inertia forces, but which requires no more space than that which would be required by an engine balancer which balanced only the primary inertia forces.

Another object of the present invention is to provide an engine balancer which balances both the primary and secondary unbalance that exists in each cylinder of an engine.

Another object of the present invention is to provide an engine balancer for balancing both primary and secondary unbalanced inertia forces and which can be used to balance any engine with both primary and secondary unbalance.

Yet another object of the present invention is to provide an engine balancer which balances both primary and secondary inertia forces by the use of eccentrically weighted counterrotating shafts and in which the rotating shafts for balancing the secondary inertia forces only rotate at crankshaft speed with respect to their supporting structure.

The above objects are accomplished by providing two primary weight shafts parallel to the crankshaft and located equal distances from the center line of the cylinders. The primary weight shafts are driven at crankshaft speed and are weighted so as to generate forces for each cylinder to match the unbalanced forces of that cylinder in proper phase relation. The primary weight shafts are bored out and have secondary weight shafts revolving within them at twice crankshaft speed. The secondary weight shafts are driven in the same direction as the associated primary weight shafts in which they turn, thus keeping a rubbing velocity of the secondary weight shaft journals down to crankshaft speed effect. The secondary weight shafts are also weighted so as to generate forces for each cylinder to match the unbalanced secondary forces of that cylinder in proper phase relation.

The above objects and the details of construction of the present invention will become apparent from a reading of the following detailed description taken in conjunction with the accompanying drawing.

BRIEF DESCRIPTION OF THE DRAWING

In the drawing:

FIG. 1 is a sectional view taken along the lines 1—1 of FIGS. 2–4 and illustrating one side of an engine balancer constructed in accordance with the principles of the present invention;

FIG. 2 is a sectional view taken substantially along the lines 2—2 of FIG. 1;

FIG. 3 is a sectional view taken substantially along the lines 3—3 of FIG. 1;

FIG. 4 is a sectional view taken substantially along the lines 4—4 of FIG. 1;

FIG. 5 is a schematic view of a gear drive arrangement suitable for driving the counterrotating shafts when the balancer is located below the engine crankshaft; and FIG. 6 is a view similar to FIG. 5 but illustrating a suitable gear drive arrangement for use when the engine balancer is located above the engine crankshaft and beside the pistons.

DESCRIPTION OF THE PREFERRED EMBODIMENTS

Referring now to the drawing, and particularly to FIGS. 1–5, an engine balancer designed for a three cylinder in-line engine is illustrated as being mounted below the engine pistons and crankshaft. The engine balancer, indicated generally at 10, includes a pair of hollow primary weight shafts 11 and 12 which are journaled in a supporting structure indicated generally at 13, and a pair of secondary weight shafts 14 and 15 which are journaled within the hollow primary weight shafts. The supporting structure 13 can be a part of the engine crankcase, or can be a separate member which is secured to the engine oil pan or the like.

The primary weight shafts 11 and 12 extend parallel to the axis of rotation of the engine crankshaft which is represented in FIG. 5 by the rotation circle 16 of the crankpins, and are positioned on opposite sides of the center line of the cylinder 17 at equal distances therefrom. The primary weight shafts extend the entire distance of the bank of cylinders, and are supported by the supporting structure 13 between each pair of adjacent cylinders 17 and in front of and behind the first and last cylinders in the bank. In a three cylinder engine, the supporting structure 13 provides four points of support for each primary weight shaft, with the first point of support 18 located forwardly of the first cylinder in the bank, the second and third points of support 19 and 20 located between the first and second, and second and third cylinders, respectively, and the fourth point of support 21 located rearwardly of the last cylinder.

Between each pair of adjacent support points, the primary weight shafts 11 and 12 have been flattened to give the shafts an unbalance by providing the center of gravity of the shafts between the points of support to the side of the axis of rotation of the shafts as at 22, 23 and 24 on shaft 11 and 25, 26 and 27 on shaft 12. Between each pair of adjacent points of support, the center of gravity of each of the primary weight shafts is offset from the axis of rotation of the shaft a sufficient amount to create a centrifugal force which is equal to one-half of the inertia force of the associated piston and piston rod when the primary weight shafts are driven at crankshaft speed.

In order to drive the shafts 11 and 12 at crankshaft speed, the shafts 11 and 12 are provided with gears 28 and 29, respectively, at their forward ends. The gears 28 and 29 are in mesh with one another so that the rotation of shaft 12 is transmitted to shaft 11. Shaft 12 is driven by a first idler gear 30 which meshes with the gear 29 and which in turn is driven by a second idler gear 31. The idler gear 31 meshes with and is driven by a crankshaft gear 32 secured to the forward end of the engine crankshaft.

The angles of location of the flattened areas on the primary weight shafts are chosen so that the generated forces for each cylinder match the unbalanced inertia forces of that cylinder in proper phase relation, or that the vertical components of the centrifugal forces set up by the primary weight shafts are opposite to the primary inertia forces of the reciprocating parts. This simply requires that the center of gravity of each flattened portion be directly below the axis of rotation of the shaft when the piston in the corresponding cylinder is at top dead center. With the shafts 11 and 12 rotating in opposite directions, due to the fact that the shaft 11 is driven directly by shaft 12, the horizontal components of the centrifugal force set up in one of the shafts will cancel the horizontal components of the centrifugal force set up in the other shaft. This leaves only the vertical components of the centrifugal forces set up in two primary weight shafts, and the sum of these forces is equal and opposite to the primary inertia forces of the reciprocating parts of the engine.

As is apparent from the position of the flattened portions of the primary weight shafts 11 and 12 illustrated in FIGS. 2–4, each of the engine crankpins leads one of the other crankpins by 120° and lags one of the other crankpins by 120°. For example, assuming the crankshaft is rotating in a clockwise direction as viewed in FIG. 5, the shaft 11 would be rotating in a clockwise direction and the shaft 12 rotating in a counterclockwise direction. With these directions of rotation, the piston corresponding to the sections of the primary shafts shown in FIG. 2 would be at top dead center, the piston corresponding to the sections of the primary weight shafts shown in FIG. 3 would be two-thirds of the way along downstroke, and the piston corresponding to the sections of the primary weight shafts illustrated in FIG. 4 would be one-third of the way along its upstroke.

As previously indicated, the secondary weight shafts 14 and 15 are journaled within the hollow primary weight shafts 11 and 12. The shafts 14 and 15 are each supported at four points along the length of the associated primary weight shafts, and these four points of support correspond exactly to the points of support 18–21 for the primary weight shafts.

Like the primary weight shafts 11 and 12, the secondary weight shafts 14 and 15 have been flattened between each pair of adjacent points of support to give the shafts an unbalance by providing the center of gravity of the shafts between the points of support to the side of the axis of rotation as at 33, 34 and 35 on shaft 14 and 36, 37 and 38 on shaft 15.

Between each adjacent pair of points of support, the center of gravity of each of the secondary weight shafts is offset from the axis of rotation of the shaft a sufficient amount to create a centrifugal force which is equal to one-half of the secondary inertia force of the associated piston and piston rod when the secondary weight shafts are driven at twice crankshaft speed.

In order to drive the secondary weight shafts 14 and 15 at twice crankshaft speed, the shafts 14 and 15 are provided with gears 39 and 40, respectively, at their forward ends. The gear 39 is driven directly by the large idler gear 31, and the gear 40 is driven by the large idler gear 31 through an intermediate idler gear 41. Due to the relative sizes of the gears 39, 40, 31, 32 and 41, the gears 39 and 40 are driven at twice the speed of the gear 32. As can be seen from the gearing arrangement illustrated in FIG. 5, the secondary weight shafts only rotate at crankshaft speed with respect to their supports, the primary weight shafts 11 and 12. The reason for this is that the secondary weight shafts are carried by and driven in the same direction as the primary weight shafts.

The angles of location of the flattened areas on the secondary weight shafts 14 and 15 are also chosen so that the generated forces for each cylinder match the unbalanced secondary inertia forces of that cylinder in proper phase relation, or that the vertical components of the centrifugal force set up by the secondary weight shafts are opposite to the secondary inertia forces set up by the reciprocating parts. As with the primary weight shafts, this simply requires that the center of gravity of each flattened portion be directly below the axis of rotation of the shaft whenever the piston in the corresponding cylinder is at the top dead center. Since the secondary weight shafts 14 and 15 are also rotated in opposite directions, the horizontal components of the centrifugal force set up in one of the shafts is cancelled by the horizontal components of the centrifugal force set up in the other shaft. This leaves only the vertical components of the centrifugal forces set up in the two secondary weight shafts, and the sum of these forces is equal and oppostie to the secondary inertia forces of the reciprocating parts of the engine.

Referring now to FIG. 6, a modified form of engine balancer is illustrated in which the primary and secondary weight shafts are located above the axis of rotation of the engine crankshaft and to the sides of the bank of cylinders 42. In the embodiment illustrated in FIG. 6, the primary weight shafts are provided with gears 43 and 44 at their forward ends, and the secondary weight shafts are provided with gears 45 and 46 at their forward ends.

In the FIG. 6 embodiment, the pistons 47 drive a crankshaft represented by the circle of rotation 48 of the crankpins, and the crankshaft drives a gear 49 mounted on the forward end thereof. The gear 49 drives a large idler gear assembly indicated generally at 50. The assembly 50 includes a large gear 51 which drives the gear 51 which drives the gear 46 on the right-hand secondary weight shaft and a small gear 52 which drives the gear 44 on the right-hand primary weight shaft. The gears 43 and 45 on the left-hand primary and secondary weight shafts are driven by a small idler gear assembly indicated generally at 53. The assembly 53 includes large and small gears 54 and 55 which mesh with the gears 45 and 43, respectively. The small gear 55 of the idler gear assembly 53 meshes with the small gear 52 on the idler gear assembly 50 so that the idler gear assembly 53 is driven by the idler gear assembly 50.

As is apparent from the relative sizes and the relationship of the gears illustrated in FIG. 6, the primary weight shafts are driven at crankshaft speed and in opposite directions while the secondary weight shafts are driven at twice crankshaft speed and in the same direction as the associated primary weight shafts in which they are journaled.

While the foregoing has described an engine balancer for use with a three cylinder in-line engine, the balancer can be used in an in-line engine with any number of cylinders, it only being necessary to extend the balancer shafts to span all the cylinders and to phase each section of the balancer to balance the inertia forces of each particular cylinder. Thus, in-line engines with both primary and secondary unbalance that can be balanced with a balancer constructed in accordance with the principles of the present invention are: one, two, three, five, seven and nine cylinder, etc. and this does not exclude the use of these balancer elements on certain V-type engines.

It should also be noted that a balancer constructed in accordance with the principles of the present invention can be used on an in-line engine with crankpins at uneven angles if desired and both primary and secondary balance is accomplished since each cylinder of the engine is balanced by the balancer elements at that cylinder.

I claim:

1. A balancer for an engine having a crankshaft, said balancer including a pair of hollow eccentrically weighted shafts mounted for rotation on opposite sides of said crankshaft; a second pair of eccentrically weighted shafts mounted for rotation within said pair of hollow shafts; and drive means for rotating said pair of hollow shafts at crankshaft speed and said second pair of shafts at twice crankshaft speed.

2. A balancer as set forth in claim 1 wherein said drive means rotates said hollow shafts in opposite directions and each of said second pair of shafts in the same direction as the hollow shaft in which it rotates.

3. A balancer for an engine having a plurality of pistons drivingly connected to a crankshaft, said balancer comprising: a pair of rotatable eccentrically weighted hollow shafts mounted parallel to said crankshaft and on opposite sides of a center line through said pistons; a second pair of eccentrically weighted shafts rotatably mounted within said hollow shafts; each of said shafts being of sufficient length to span all of said plurality of pistons; and drive means for rotating said hollow shafts at crankshaft speed and said second pair of shafts at twice crankshaft speed.

4. A balancer as set forth in claim 3 wherein each of said shafts is supported at points fore-and-aft of each of said plurality of cylinders.

5. A balancer as set forth in claim 3 wherein said drive means rotates said hollow shafts in opposite directions and each of said second pair of shafts in the same direction as the hollow shaft in which it rotates.

6. A balancer as set forth in claim 3 wherein only the sections of each of said shafts which correspond to the positions of said pistons along the lengths of said shafts are eccentrically weighted.

7. A balancer as set forth in claim 6 wherein said eccentrically weighted sections of said shafts are phased to present the center of gravity of each eccentrically weighted section below the axis of rotation of the shaft when the corresponding piston is at approximately top dead center.

8. A balancer for a machine that has reciprocating components which set up both primary and secondary unbalanced inertia forces in the machine, said balancer comprising: a pair of eccentrically weighted hollow shafts rotatably mounted on opposite sides of the general path of movement of said reciprocating components and substantially perpendicular thereto; a second pair of eccentrically weighted shafts rotatably mounted within said hollow shafts; and drive means for rotating said hollow shafts at a speed of one revolution for each full cycle of reciprocation of said reciprocating components and said second pair of shafts at twice the speed of said hollow shafts.

9. A balancer as set forth in claim 8 wherein said drive means rotates said hollow shafts in opposite directions and each of said second pair of shafts in the same direction as the hollow shaft in which it rotates.

References Cited

UNITED STATES PATENTS

| 2,838,957 | 6/1958 | Johnson | 74—604 |
| 3,402,707 | 9/1968 | Heron | 74—603 XR |

FOREIGN PATENTS

| 674,225 | 6/1952 | Great Britain. |

OTHER REFERENCES

Pope, A. W. Jr.: The C.U.E. Cooperative Universal Engine in SAE Journal (Transaction), 48(1): pp. 33–39. January 1941.

FRED C. MATTERN, JR., Primary Examiner

F. D. SHOEMAKER, Assistant Examiner

U.S. Cl. X.R.

123—192